United States Patent
Hussaini et al.

(10) Patent No.: US 6,932,485 B2
(45) Date of Patent: Aug. 23, 2005

(54) LIGHT APPARATUS FOR ILLUMINATING A VIDEO SCREEN

(75) Inventors: Saied Hussaini, Miami, FL (US); Marc Iacovelli, Miami, FL (US)

(73) Assignee: Intec, Inc., Miami, FL (US)

( * ) Notice: Subject to any disclaimer, the term of this patent is extended or adjusted under 35 U.S.C. 154(b) by 132 days.

(21) Appl. No.: 10/396,563

(22) Filed: Mar. 26, 2003

(65) Prior Publication Data

US 2004/0190282 A1 Sep. 30, 2004

(51) Int. Cl.$^7$ ............................................. F21V 33/00
(52) U.S. Cl. ........................ 362/85; 362/109; 362/253
(58) Field of Search ........................... 362/85, 98, 109, 362/234, 253

(56) References Cited

U.S. PATENT DOCUMENTS

| | | | | |
|---|---|---|---|---|
| 5,122,937 A | * | 6/1992 | Stoudemire | 362/109 |
| 5,172,974 A | * | 12/1992 | Riban | 362/109 |
| 5,485,359 A | * | 1/1996 | Galvin | 362/109 |
| 6,050,696 A | * | 4/2000 | Radley | 362/109 |
| 6,367,946 B1 | * | 4/2002 | Leifer et al. | 362/190 |
| 6,533,431 B2 | * | 3/2003 | Leifer et al. | 362/109 |
| 6,648,487 B2 | * | 11/2003 | Liao | 362/85 |
| 6,729,739 B2 | * | 5/2004 | Siegel et al. | 362/85 |

* cited by examiner

Primary Examiner—John Anthony Ward
(74) Attorney, Agent, or Firm—Berenato, White & Stavish

(57) ABSTRACT

An accessory lighting assembly for selectively illuminating user selected areas such as, for example, compact computer devices, books and other desired areas. The lighting assembly comprises a base portion for mounting to the user-selected area, a pivotable extension, and a pivotable light portion with a light source. The light source is selectively directed toward a user selected area for illumination and may be pivoted between a working position where light source is adapted to be directed toward the user selected area and a storage position where the light source is housed within a recess formed in the extension. A rechargeable battery pack provides electric power and the light source may be a fluorescent light bulb.

9 Claims, 4 Drawing Sheets

LIGHT APPARATUS FOR ILLUMINATING A VIDEO SCREEN

BACKGROUND OF THE INVENTION

1. Field of the Invention

The present invention relates to compact and foldable lighting devices, and more particularly, to a compact, foldable lighting device for selectively illuminating a desired area.

2. Description of the Related Art

Compact computers and portable video game devices having video viewing screens are becoming more and more popular and typically comprise hand-held portable, battery-operated devices. The viewing screen is typically a liquid crystal display (LCD) that is generally flat and displays information and or provides the screen for playing video games. Such compact computers and video games may include, but are not limited to: calculators, computer video games, lap top computers, and other computers where a variety of software is employed. In particular, compact video games, such as the compact video game systems known as GAME BOY™, GAME BOY POCKET™ and GAME BOY COLOR™ (Trademarks of Nintendo of America), are completely self-sustained video game systems which may be operated by interchangeably employing a collection from a library of software game packs. These video game systems provide a compact, self-contained, battery-operated, portable hand-held computer with a cross key joy stick (directional-pad or D-pad) to operate the game, start and select buttons, action buttons and an LCD-type screen, together with volume controls so as to display and enable the user to display images and play games.

While video display screens are employed and typically include a flat LCD-type screen, such LCD-type display screens are often difficult to observe by the user in partial or low light conditions, such as, for example, automobiles, planes, trains, buses, and the like due to the lack of illumination on the LCD screen to permit suitable contrast during use.

Conventional a light apparatus for use with compact computer screens includes an open video space designed to be the same size as the LCD video screen of the compact computer apparatus. The light apparatus includes a pair of light bulbs placed on either side of sloping panels and which side panels also include a short, solid, upward extending light shield so as to prevent the direct glare of the light bulbs onto the LCD screen and to provide for indirect lighting through reflection on the light-colored side panels onto the LCD viewing screen.

Other conventional lighting devices disclose combined light and mirror or magnifier devices for hand-held computers with video screens. Each of these conventional devices include a battery operated light assembly that is mounted to a separate assembly mounted adjacent the view screen and spaced from the magnifier lens. These devices are adapted to provide a screen magnifier while also providing additional light to the screen for playing in low light conditions.

Unfortunately, the use of an LCD screen in these hand-held video game devices makes the illumination of the same difficult. The primary reason for this difficulty is due to the fact that the plastic cover to the actual LCD screen is generally of a high-gloss finish, and as such has a tendency to reflect light. This reflection of light primarily occurs when the light shines substantially directly onto the screen, and thus, the high-gloss screen cover prevents the light from penetrating the cover and thereby illuminating the LCD screen.

In addition, book lights or portable reading lamps all operate on the principle of selectively disposing a light source, such as, for example, a light bulb in a position over the area to be illuminated. Various reading light assemblies have been disclosed where the light source is adjustable so as to be positioned over the area to be illuminated. In each of these prior art devices, the light source generates light that is not evenly dispersed across the desired area and also requires constant maneuvering by the user to accommodate their use of the device.

None of the aforementioned devices quickly and easily fold into a compact non-lighted arrangement on the video screen for storage or transportation. In addition, none of these conventional devices utilize rechargeable and replaceable battery packs as an energy source.

The need therefore exists for a more versatile lighting accessory to illuminate a handheld video device.

SUMMARY OF THE INVENTION

It is therefore an object of the invention to provide an improved lighting assembly for hand-held video games that is more compact and transportable during non-use.

The invention provides an improved lighting assembly for hand-held video games that effectively utilizes adjustable positioning of the lighting devices to efficiently illuminate the LCD display screen of the game device.

The invention provides an accessory lighting device that utilizes a removable and rechargeable battery pack to power the light source independently of the game device.

The invention provides a fluorescent light source to illuminate the LCD display screen of the game device, while using less electric energy.

The invention also provides a rotary switch that powers the light source when the light device is pivoted to predetermined position relative to the game device thereby eliminating the need for a separate manual switch.

These and other objects are achieved in accordance with an embodiment of the present invention in which a light assembly for use in enhancing the view of a compact computer video screen includes a base portion adapted to fit over a top edge of the compact computer device. An upward extension is pivotally connected to the base portion and pivoting light source is mounted to the upward extension. The light source is disposed within a recess in the pivoting light portion. Through the variable positioning of the upward extension and pivoting light portion (via the pivotal connections) the user can selectively adjust the amount of light directed down onto the video display screen.

In accordance with another embodiment of the present invention, a light assembly for use in enhancing the view of a user-selected area includes a light source with a rotary switch that powers the light source when the pivoting light portion reaches a predetermined position relative to the game device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF PREFERRED EMBODIMENTS

Figure 1:
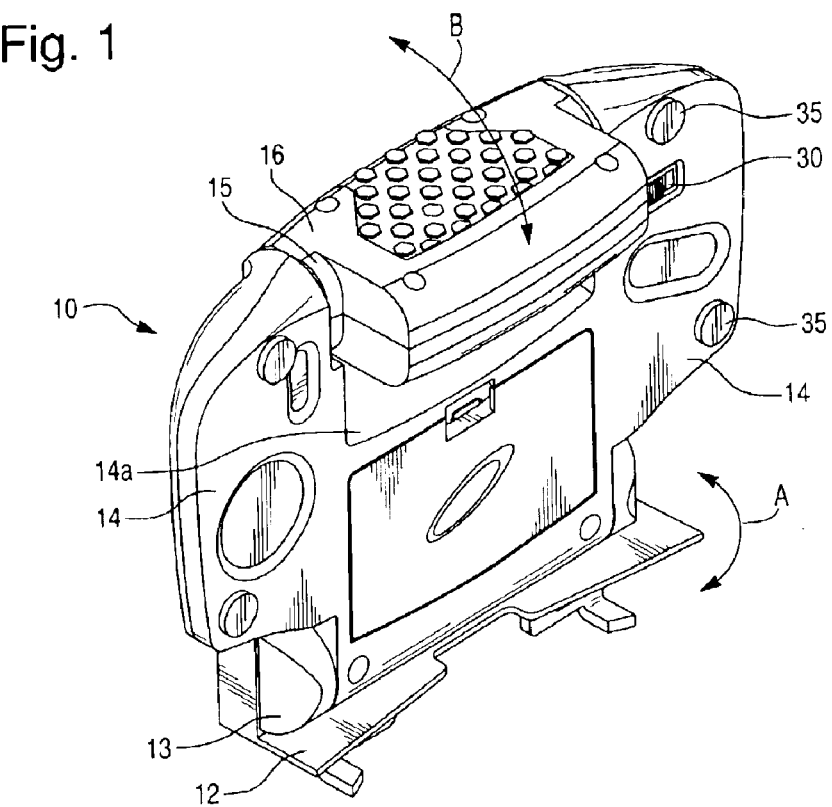
FIG. 1 is a perspective view of the game light assembly according to a first embodiment of the invention.

FIG. 1 shows the light assembly 10 according to a first embodiment of the invention. Light assembly 10 includes a base portion 12 adapted to be releasably attached to a hand held video game device and an upward extension 14 pivotally fixed to the base portion 12 via hinge 13 as shown by the arrow 'A'. A pivoting light portion 16 is located opposite the base portion 12 and pivots via a hinge 15 about an angle of at least 180° as shown by the arrow 'B'. In the position shown in FIG. 1, the pivoting light portion 16 is shown at an angle of 90° with respect to the upward extension 14.

Figure 3:
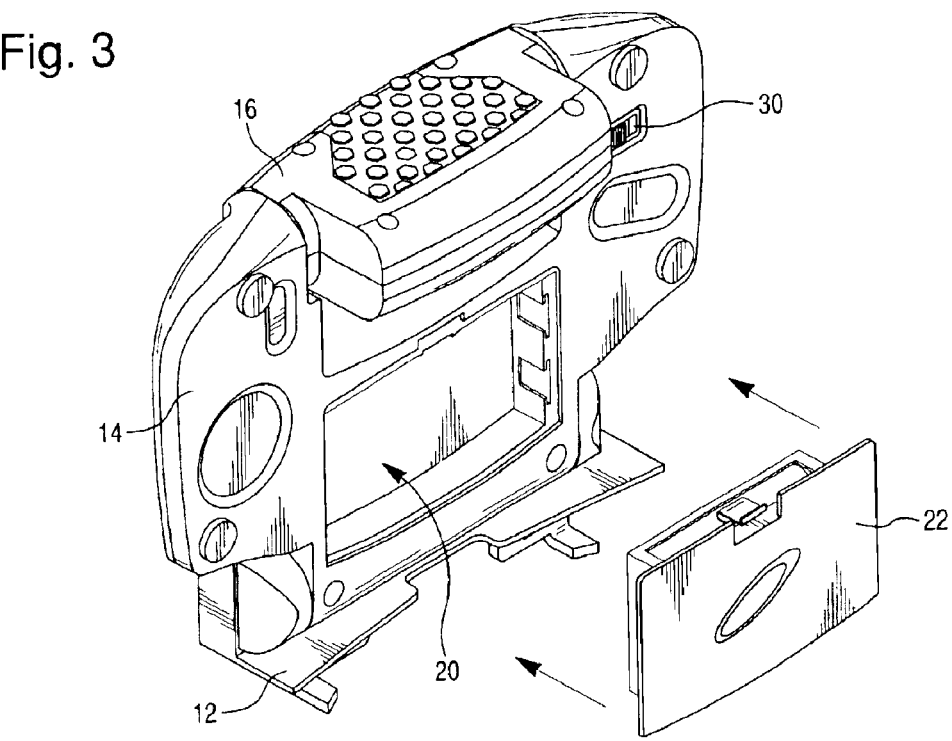
FIG. 3 is a perspective view of the game light assembly of FIG. 1 showing the removable and rechargeable battery pack according to the invention.

According to the preferred embodiments of this invention, the upward extension 14 has a recessed battery compartment 20 formed to receive and mount a rechargeable battery pack 22 (see FIG. 3). The battery compartment 20 is designed with suitable contacts to provide an electrical connection with the battery pack 22 to thereby provide a power supply for the light. In this manner, the light assembly 10 does not rely on or draw on the power supply of the game device.

Figure 2:
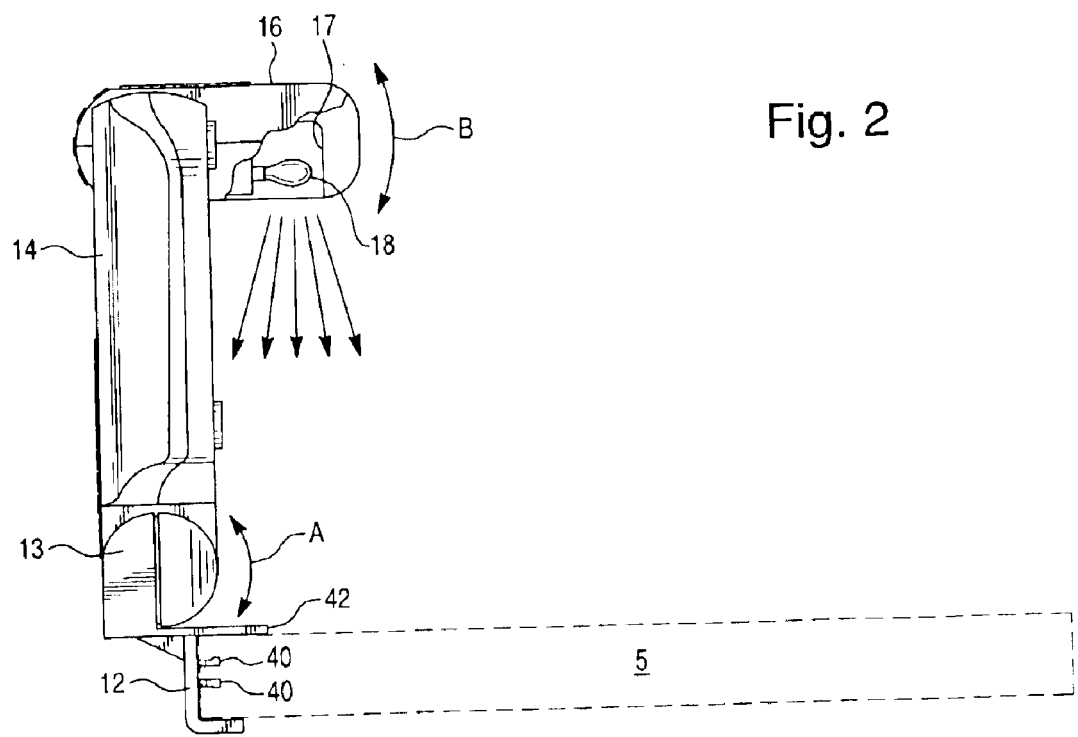
FIG. 2 is a side view of the game light assembly of FIG. 1 with the game playing apparatus shown in phantom.
Figure 5:
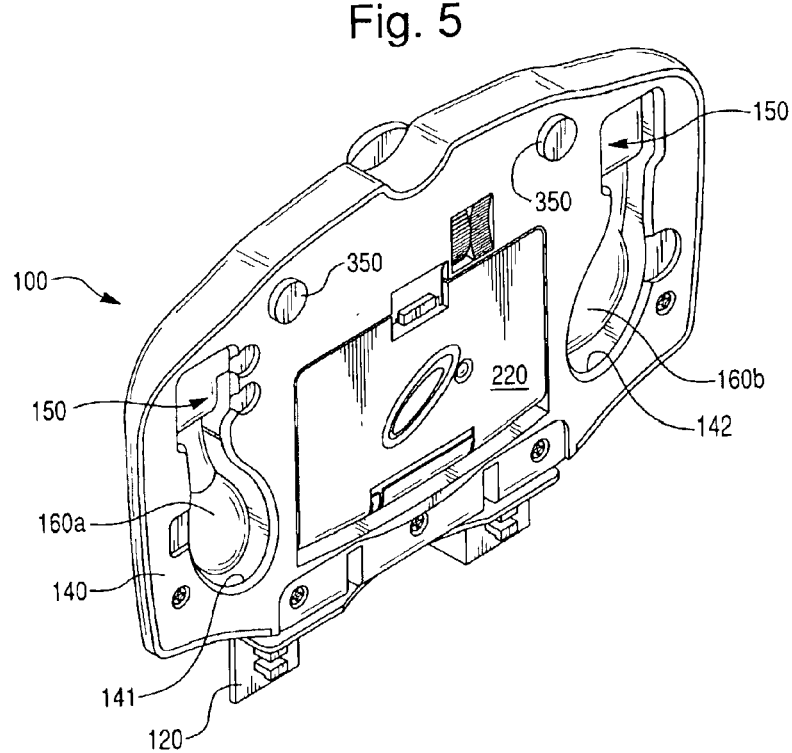
FIG. 5 is a perspective view of the game light assembly according to a second embodiment of the invention with the pivoting light portion shown in a retracted position.
Figure 6:
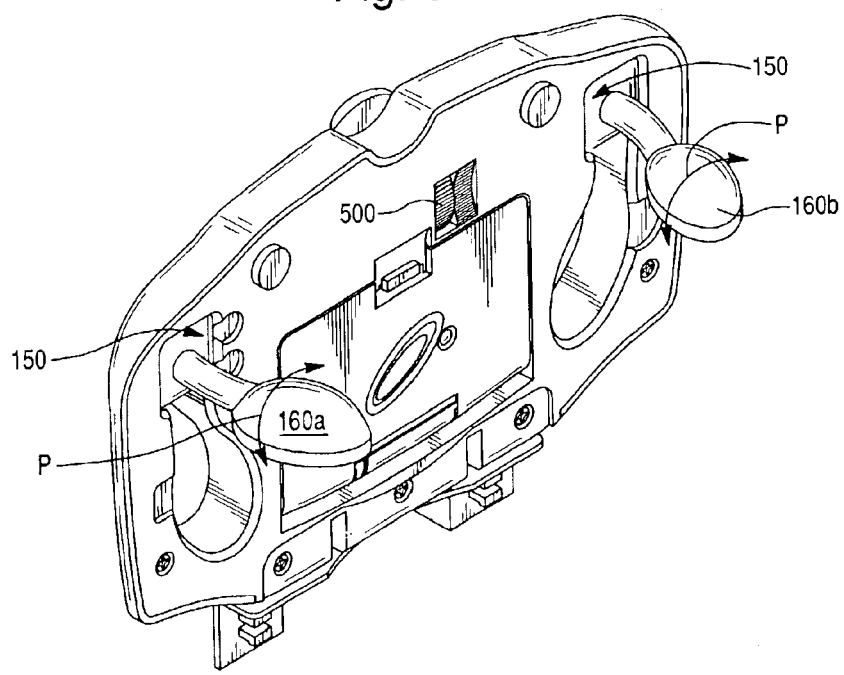
FIG. 6 is a perspective view of the game light assembly according to FIG. 5 with the pivoting light portion shown in a working position.

In the embodiment of FIGS. 1–3, an on/off power switch 30 is provided on the upward extension 14 whereby the switch 30 allows the user to selectively turn on and off the light assembly 10. In another embodiment illustrated in FIGS. 5–7, there is no power switch on the extension portion 140. Instead, the light assembly 100 includes a rotary switch associated with a pivoting motion of the pivoting light portion 160 and the light assembly is powered on and off with the pivoting motion of the light portion 160. Those of ordinary skill in the art understand that the electrical connections made within the light assembly and the manner of manufacturing the same may be made by any suitable known type of electrical connections and manufacturing methods.

Light assembly 10 is preferably made of molded plastic to dimensionally fit the Game Boys™, but may also be made of any suitable known material capable of being shaped into a desired style. Additionally, the molded plastic body is preferably formed with ornamental features that enhance the outer appearance of the light assembly. Likewise, cushion pads 35 may be provided on the molded plastic body (e.g., the upward extension) to reduce any scratches or damage to the game device when the light assembly is placed in the folded position for storage or transportation when not is use.

Figure 4:
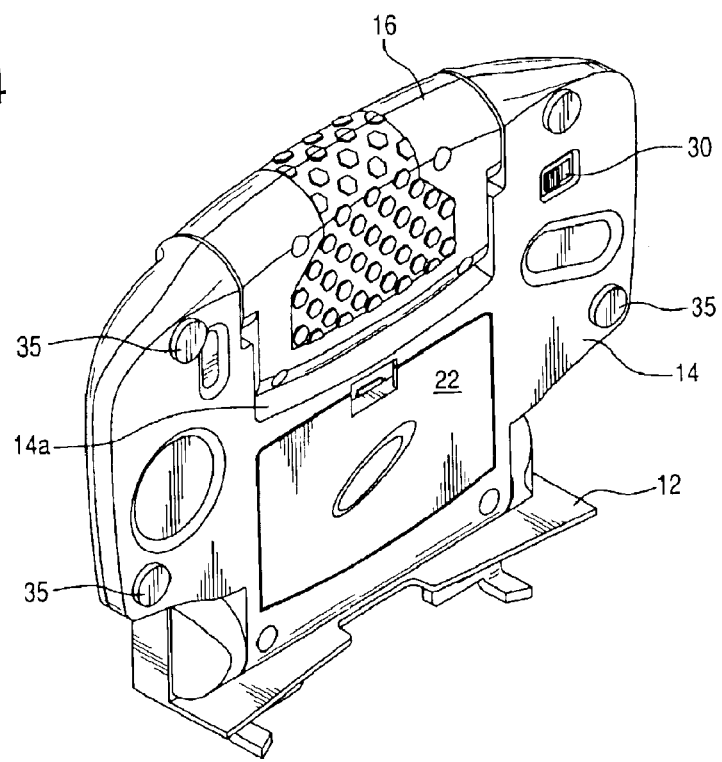
FIG. 4 is a perspective view of the game light assembly according to a first embodiment of the invention with the pivoting light portion disposed in the recess in the upward extension.

The upward extension 14 is designed to pivot with respect to the base portion 12 so that the upward extension 14 may be pivoted 90° into a downward direction to lay flush against the game device. Likewise, the pivoting light portion 16 is designed to pivot with respect to the upward extension 14 so that the pivoting light portion 16 lies in the plane of the upward extension 14 and is disposed in recess 14a provided in the extension 14 (see FIG. 4).

The pivoting light portion 16 includes a recess 17 adapted to receive and house a light source 18 that is directed away from the pivoting light portion 16 toward the game device 5 as shown in FIG. 2. Light source 18 can be any suitable known light source such as, for example, an incandescent bulb, a fluorescent light, a light emitting diode (LED), a directional LED, etc. However, in the preferred embodiment of FIG. 1 the light source is a fluorescent light to reduce glare and reflection while maximizing the efficiency of illuminating the video display screen. More importantly, a fluorescent light source requires less energy than an incandescent bulb; therefore, the fluorescent light will be less of a power drain on the rechargeable battery pack 22. Those of skill in the art will recognize that the type of light source may be a matter of design choice and may be changed without departing from the spirit of this disclosure. In one preferred embodiment, the light source includes a lens or other means for facilitating the directability or focusing of the light toward the surface of the video display screen.

The upward extension 14 of the light assembly 10 may include various integrated members in order to increase its strength and integrity during attachment and detachment to and from the game device 5. Those of ordinary skill in the art will recognize that other methods and designs for these portions of base 12 can be altered without departing from the scope of the invention.

Depending on the particular game device 5, an infrared (IR) window (not shown—e.g., GAME BOY™ and GAME BOY COLOR™) or on/off power switch (not shown—e.g., GAME BOY POCKET™) is disposed on the top edge of the game device. As such, base portion 12 includes a cutout or opening positioned so as to accommodate the IR window or on/off switch on the game device and keep them accessible when light assembly 10 is disposed in its operable position.

As shown in FIGS. 1–4, through the application of hinged connections 13 and 15, the user can manipulate the angular positions of upward extension 14 and light portion 16 to adjust the angular position of light 18 with respect to the display screen, and thereby enables the user to increase and/or decrease the amount of light being directed toward display screen corresponding to the angular position of the light.

In an alternate embodiment, the light assembly 10 can utilize the link port of the game device 5 in order to obtain power, a link port is provided on the external surface of the base portion 12 so as to provide the user with all the functionality of such link port while the light assembly 10 is disposed in its operable position on the game device 5. Those of ordinary skill in the art will recognize that the position of the externally provided link port can be changed without departing from the spirit of this disclosure.

FIG. 2 shows a side view of the light assembly 10 and how the base portion 12 engages the game device 5 according to one preferred embodiment. The base portion 12 includes tangs 40 adapted to engage the corresponding holes in a side of the game device 5. As described earlier, when base portion 12 is slid onto the top side of the game device, the tangs 40 snaps into the holes provided in the game device and the top flange 42 provides sufficient retention force and resistive moment force (torque) due to pivoting action (folding and unfolding) of upward extension 14 to secure the light assembly 10 into its operable position on the game device. Conversely, the removal of light assembly 10 simply requires the user to "un-snap" tangs 40 from their secured position in the top side and slide the base portion 12 of the light assembly in the reverse direction for removal from the game device 5.

Through the hinged connection 15 of the light portion 16 with upward extension 14 and the hinged connection 13 of the upward extension 14 with the base portion 12, the light assembly 10 can be flattened over the game device 5 and screen. This folding aspect (or unfolding) of the light assembly not only functions to place the light assembly 10 into a storage position without requiring its removal from the game device, but also functions to protect the upper surface of the game device 5.

FIGS. 5–8 show the light assembly 100 according to a second embodiment of the invention. Light assembly 100 includes a base portion 120 adapted to be releasably attached to a hand held video game device and an upward extension 140 pivotally fixed to the base portion 120 via hinge 130 as shown by the arrow 'A'. A pair of pivoting and rotating light portions 160*a*, 160*b* are located opposite the base portion 120 and pivots via a hinge 150 about an angle of at least 90° as shown by the FIGS. 5 and 6. In the position shown in FIG. 6, the pivoting and rotating light portions 160*a*, 160*b* are shown at an angle of 90° with respect to the upward extension 140. In this position, the illumination means is directed toward the game device and screen. Also, the light portions 160*a*, 160*b* are adapted to pivot in the manner shown by arrows 'P' to further adjust the angle of illumination with respect to the game device and screen.

According to the preferred embodiments of this invention, the upward extension 140 has a recessed battery compartment formed to receive and mount a rechargeable battery pack 220. The battery compartment is designed with suitable contacts to provide an electrical connection with the battery pack 220 to thereby provide a power supply for the light. In this manner, the light assembly 100 does not rely on or draw on the power supply of the game device.

Figure 7:
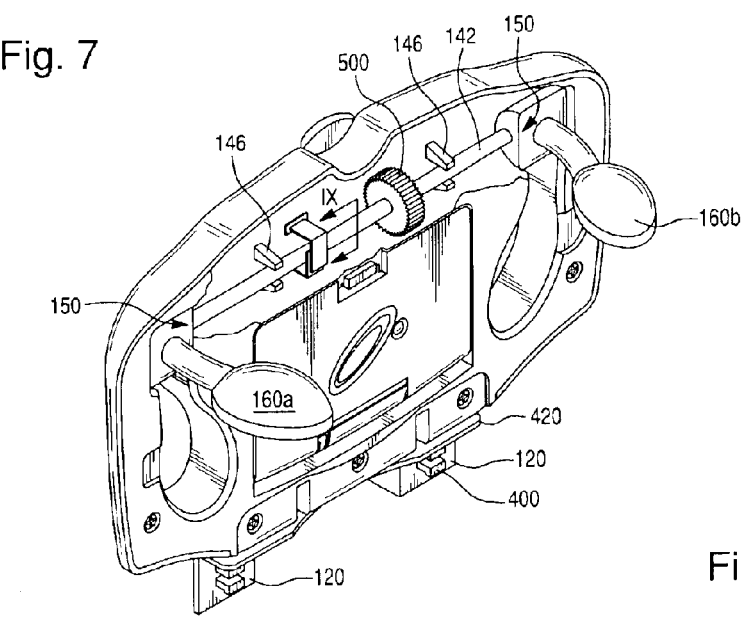
FIG. 7 is a partially cut-away perspective view of the game light assembly according to FIG. 5 with the pivoting light portion shown in a working position and with the internal hinge assembly shown.

In the embodiment illustrated in FIGS. 5–8, there is no exposed power switch on the extension portion 140; instead, the light assembly 100 includes a rotary switch 500 associated with a pivoting motion of the pivoting light portion 160 and the light assembly is powered on and off with the pivoting motion of the light portion 160. More specifically as shown in FIG. 7, the extension portion 140 houses a shaft 142 fixed to the rotary switch 500 and to the light portions 160*a*, 160*b*. The shaft 142 is mounted upon bearing portions 146 suitable formed within the extension portion 140 to permit rotation of the shaft 142. Therefore, when the rotary switch is actuated/rotated, rotary movement of the switch 500 causes rotation of the shaft 142 and rotation of the light portions 160*a*, 160*b*; i.e., between the positions shown in FIGS. 5 and 6.

Figure 9:
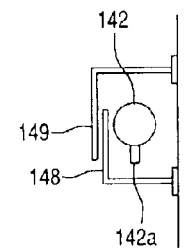
FIG. 9 is a partial cross-section taken along section line IX—IX of FIG. 7 and showing the electrical connection operated by the rotary switch.

Moreover, the electrical connection between the internal circuitry of the light assembly 100 and the pivoting light portions 160*a*, 160*b* is such that the circuit is completed and power is delivered to the lights 180 when the light portions 160*a*, 160*b* have pivoted a predetermined angle relative to the extension portion 140. Therefore, the rotation of the light portion 160*a*, 160*b* controls the on/off function of the light assembly 100. In the preferred embodiment, a metallic switch is disposed adjacent the shaft 142 and the shaft 142 is formed with a cam element 142*a* as shown in FIG. 9. As the shaft 142 rotated, the cam 142*a* pushes the metallic element 148 into contact with metallic element 149 to complete the electric circuit delivering electricity to the lights 180 disposed within the light portions 160*a*, 160*b*. Those of ordinary skill in the art understand that the electrical connections made within the light assembly and the manner of manufacturing the same may be made by any suitable known type of electrical connections and manufacturing methods.

The rotary switch is connected to several subcomponent mechanisms to retract and stow away the light head and connecting member for space saving and mobility feature. Alsi, it acts as automatic on/off power switch depending on the rotary switch position.

Light assembly 100 is also preferably made of molded plastic to dimensionally fit the Game Boys™, but may also be made of any suitable known material capable of being shaped into a desired style. Additionally, the molded plastic body is preferably formed with ornamental features that enhance the outer appearance of the light assembly. Likewise, cushion pads 350 may be provided on the molded plastic body (e.g., the upward extension) to reduce any scratches or damage to the game device when the light assembly is placed in the folded position for storage or transportation when not is use.

The upward extension 140 is designed to pivot with respect to the base portion 120 so that the upward extension 140 may be pivoted 90° into a downward direction to lay flush against the game device. Likewise, the pivoting light portions 160*a*, 160*b* are designed to pivot with respect to the upward extension 140 so that the pivoting light portions 160*a*, 160*b* are received within recesses 141, 142 formed in the plane of the upward extension 140 (see FIG. 5).

Figure 8:
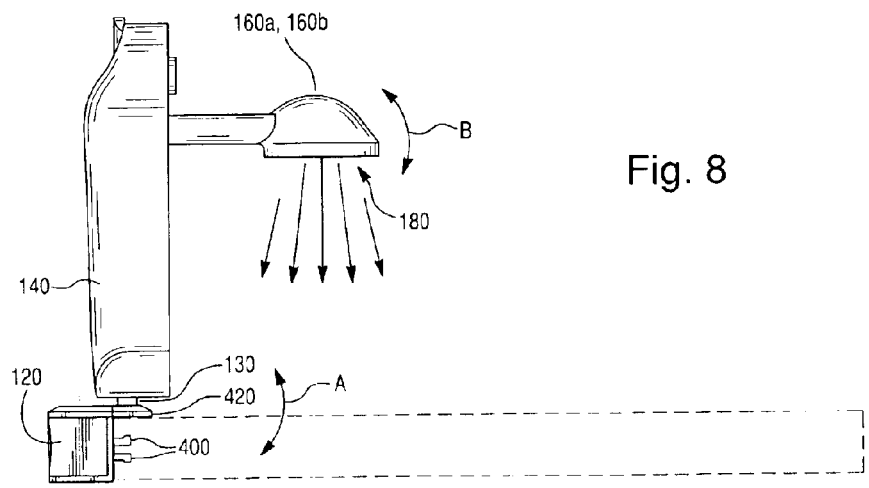
FIG. 8 is a side view of the game light assembly of FIG. 5 with the game playing apparatus shown in phantom.

The pivoting light portions 160*a*, 160*b* include a recess adapted to receive and house a light source 180 that is directed away from the pivoting light portions 160*a*, 160*b* toward the game device 5 as shown in FIG. 8. Light source 180 can be any suitable known light source such as, for example, an incandescent bulb, a fluorescent light, a light emitting diode (LED), a directional LED, etc. Those of skill in the art will recognize that the type of light source may be a matter of design choice and may be changed without departing from the spirit of this disclosure. In one preferred embodiment, the light source includes a lens or other means for facilitating the directability or focusing of the light toward the surface of the video display screen.

The upward extension 140 of the light assembly 100 may include various integrated members in order to increase its strength and integrity during attachment and detachment to and from the game device 5. Those of ordinary skill in the art will recognize that other methods and designs for these portions of base 120 can be altered without departing from the scope of the invention.

Depending on the particular game device 5, an infrared (IR) window (not shown—e.g., GAME BOY™ and GAME BOY COLOR™) or on/off power switch (not shown—e.g., GAME BOY POCKET™) is disposed on the top edge of the game device. As such, base portion 120 includes a cutout or opening positioned so as to accommodate the IR window or on/off switch on the game device and keep them accessible when light assembly 100 is disposed in its operable position.

As shown in FIGS. 5–8, through the application of hinged connections 130 and 150, the user can manipulate the angular positions of upward extension 140 and light portion 160 to adjust the angular position of light 180 with respect to the display screen, and thereby enables the user to increase and/or decrease the amount of light being directed toward display screen corresponding to the angular position of the light.

FIG. 8 shows a side view of the light assembly 100 and how the base portion 120 engages the game device 5 according to one preferred embodiment. The base portion 120 includes tangs 400 adapted to engage the corresponding holes in a side of the game device 5. As described earlier, when base portion 120 is slid onto the top side of the game device, the tangs 400 snaps into the holes provided in the game device and the top flange 420 provides sufficient retention force and resistive moment force (torque) due to pivoting action (folding and unfolding) of upward extension 14 to secure the light assembly 100 into its operable position on the game device. Conversely, the removal of light assembly 100 simply requires the user to "un-snap" tangs 400 from their secured position in the top side and slide the base portion 120 of the light assembly in the reverse direction for removal from the game device 5.

Through the hinged connection 150 of the light portion 160 with upward extension 140 and the hinged connection 130 of the upward extension 140 with the base portion 120, the light assembly 100 can be flattened over the game device 5 and screen. This folding aspect (or unfolding) of the light assembly not only functions to place the light assembly 100 into a storage position without requiring its removal from the game device, but also functions to protect the upper surface of the game device 5.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An accessory light assembly for illuminating a user selected area, the lighting assembly comprising:
    a base portion having fastening tangs for fastening said light assembly to corresponding holes along a first side surface that is substantially orthogonal to the user selected area of an electronic device in a cantilevered manner such that the base portion does not engage second side surface opposite from said first side surface;
    an upward extension having a lower end pivotably connected to the base portion and an opposing upper end;
    a light portion mounting a light source, said light portion being pivotably connected to said upward extension for selectively illuminating the user selected area;
    wherein said light portion is pivotable between a working position where light source is adapted to be directed toward the user selected area and a storage position where the light source is housed within a recess formed in said upward extension.

2. The light assembly according to claim 1, further comprising a battery compartment disposed in said upward extension for receiving a battery pack adapted to house at least one rechargeable battery for supplying electricity to said light source.

3. The light assembly according to claim 2, wherein said battery pack houses at least one rechargeable battery.

4. The light assembly according claim 1, wherein said light portion pivots between a working position where light source is adapted to be directed toward the user selected area and a storage position where the light source is housed within a recess formed in said upward extension.

5. The light assembly according to claim 1, wherein said light source is a fluorescent light.

6. The light assembly according to claim 1, wherein said light source is a light emitting diode.

7. The light assembly according to claim 1, further comprising a rotary switch for completing an electrical circuit delivering power to said light source depending a pivoted position of said light portion relative to said upward extension.

8. The light assembly according to claim 7, wherein said rotary switch comprises a rotary dial operated by a user to adjust a position of the light portion.

9. The light assembly according to claim 1, further comprising a power on/off switch electrically connected to said battery pack and said light source for selectively providing power to said light source.

* * * * *